United States Patent
Haynes et al.

(10) Patent No.: US 10,793,280 B2
(45) Date of Patent: Oct. 6, 2020

(54) EVACUATION SYSTEM WITH WIND LIFT DETERRENT

(71) Applicant: GOODRICH CORPORATION, Charlotte, NC (US)

(72) Inventors: Timothy C. Haynes, Prescott Valley, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 388 days.

(21) Appl. No.: 15/594,389

(22) Filed: May 12, 2017

(65) Prior Publication Data
US 2018/0327101 A1    Nov. 15, 2018

(51) Int. Cl.
*B65D 25/14* (2006.01)
*B64D 25/14* (2006.01)
*B63C 9/22* (2006.01)
*B63B 27/14* (2006.01)

(52) U.S. Cl.
CPC ........ *B64D 25/14* (2013.01); *B63B 2027/145* (2013.01); *B63C 9/22* (2013.01)

(58) Field of Classification Search
CPC ...... B64D 25/14; B63C 9/00; B63B 2027/145
See application file for complete search history.

(56) References Cited

U.S. PATENT DOCUMENTS

| | | | | |
|---|---|---|---|---|
| 3,606,939 A | * | 9/1971 | Summer et al. | B64D 25/14 193/25 R |
| 3,845,920 A | * | 11/1974 | Satterfield | B64D 25/14 244/137.2 |
| 3,973,645 A | * | 8/1976 | Dix | B64D 25/14 182/48 |
| 4,013,247 A | * | 3/1977 | Giffin | B64D 25/14 244/137.2 |
| 4,018,321 A | * | 4/1977 | Fisher | A62B 1/20 193/25 B |
| 4,846,422 A | | 7/1989 | Fisher | |
| 5,360,186 A | * | 11/1994 | Danielson | B64D 25/14 193/25 B |
| 5,820,773 A | * | 10/1998 | Hintzman | B64D 25/14 244/137.2 |
| 5,906,340 A | * | 5/1999 | Duggal | B64D 25/14 182/48 |
| 5,975,467 A | * | 11/1999 | O'Donnell | B64D 25/14 182/48 |

(Continued)

FOREIGN PATENT DOCUMENTS

| | | |
|---|---|---|
| EP | 0034357 | 8/1981 |
| EP | 0096594 | 12/1983 |

OTHER PUBLICATIONS

European Patent Office, European Search Report dated Jun. 20, 2018 in Application No. 18172069.9-1010.

(Continued)

*Primary Examiner* — Colleen M Chavchavadze
(74) *Attorney, Agent, or Firm* — Snell & Wilmer L.L.P.

(57) ABSTRACT

An evacuation system may comprise an evacuation slide and a first underwing tube. The first underwing tube may be coupled to an outboard tube or an inboard tube of the evacuation slide. The first underwing tube may be configured to extend away from the evacuation slide upon inflation of the first underwing tube.

15 Claims, 8 Drawing Sheets

(56) References Cited

U.S. PATENT DOCUMENTS

| | | | | |
|---|---|---|---|---|
| 6,443,259 B1* | 9/2002 | Oney | ............... | B64D 25/14 |
| | | | | 182/18 |
| 6,814,183 B2* | 11/2004 | Horvath | ............ | B64D 25/14 |
| | | | | 182/48 |
| 6,877,696 B2 | 4/2005 | Moro | | |
| 8,215,586 B2* | 7/2012 | O'Donnell | ......... | B64D 25/14 |
| | | | | 182/48 |
| 9,139,305 B2 | 9/2015 | Brown | | |
| 2008/0191097 A1 | 8/2008 | McDonald | | |
| 2018/0079513 A1* | 3/2018 | Volny | ............... | B64D 25/14 |
| 2018/0312265 A1* | 11/2018 | Haynes | ............ | B64D 25/14 |
| 2018/0319507 A1* | 11/2018 | Volny | ............... | B64D 45/00 |
| 2018/0334256 A1* | 11/2018 | Haynes | ............ | B64D 25/14 |
| 2019/0061960 A1* | 2/2019 | McEwen | ............ | B64D 25/14 |
| 2019/0118956 A1* | 4/2019 | Haynes | ............ | B64D 25/14 |

OTHER PUBLICATIONS

European Patent Office, European Search Report dated Oct. 22, 2019 in Application No. 18172069.9.

* cited by examiner

EVACUATION SYSTEM WITH WIND LIFT DETERRENT

FIELD

The present disclosure relates to aircraft evacuation systems and, in particular, to an evacuation slide having underwing tubes.

BACKGROUND

Emergency evacuation systems may be used to exit an aircraft absent a jet way or other suitable means of egress for passengers. The evacuation system may deploy from the side of an aircraft fuselage, for example. A common problem associated with inflatable evacuation slides, however, is that when such slides are deployed in high lateral wind conditions, the wind may cause the slide to lift or "kite" such that the toe end of the slide does not touch the ground, rendering the slide less usable. If the slide lifts off the ground to a point above the airplane's door sill height after full extension, the slide may block the aircraft exit and prevent safe evacuation of passengers and crew.

SUMMARY

An evacuation system may comprise an evacuation slide comprising an inboard tube and an outboard tube. A first underwing tube may be coupled to at least one of the inboard tube or the outboard tube.

In various embodiments, the first underwing tube may comprise a first base portion and first tip portion. A width of the first base portion may be greater than a width of the first tip portion. The first tip portion may extend away from at least one of the inboard tube or the outboard tube at an angle between 10° and 80°. The width of the first base portion may be between 60% and 90% of a width of at least one of the inboard tube or the outboard tube. In various embodiments, the first underwing tube may comprise a conical shape.

In various embodiments, the evacuation slide may further comprise a transverse support tube extending between the outboard tube and the inboard tube. The first base portion of the first underwing tube may be disposed closer to the transverse support tube than to a head end of the evacuation slide. The first underwing tube may be in fluid communication with at least one of the inboard tube or the outboard tube.

In various embodiments, a second underwing tube may be coupled to at least one of the inboard tube or the outboard tube. The second underwing tube may be in fluid communication with at least one of the inboard tube or the outboard tube. A releasable restraint may be coupled to the evacuation slide. The first underwing tube may be configured to inflate prior to a separating of the releasable restraint.

A slide for an evacuation system may comprise an outboard tube and an inboard tube. A first underwing tube may be coupled to the outboard tube. A second underwing tube may be coupled to the inboard tube.

In various embodiments, a transverse support tube may extend between the outboard tube and the inboard tube. A first base portion of the first underwing tube may be disposed closer to the transverse support tube than a head end of the evacuation slide.

In various embodiments, the first underwing tube may comprise a first base portion and a first tip portion, and a width of the first base portion may be greater than a width of the first tip portion. The second underwing tube may comprise a second base portion and a second tip portion, and a width of the second base portion may be greater than a width of the second tip portion. The first tip portion of the first underwing tube may extend away from the outboard tube at an angle between 10° and 80°. The second tip portion of the second underwing tube may extend away from the inboard tube at an angle between 10° and 80°.

A method of making an evacuation assembly may comprise coupling a first underwing tube to an evacuation slide, and coupling a second underwing tube to the evacuation slide. The first underwing tube may be configured to extend away from the evacuation slide. The second underwing tube may be configured to extend away from the evacuation slide.

In various embodiments, the method may further comprise configuring the first underwing tube to extend away from the evacuation slide at an angle between 10° and 80°. In various embodiments the method may comprise coupling the first underwing tube to an outboard tube of the evacuation slide, and coupling the second underwing tube to an inboard tube of the evacuation slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion. As used herein, "distal" refers to the direction outward, or generally, away from a reference component. As used herein, "proximal" and/or "proximate" refers to a direction inward, or generally, towards the reference component.

Evacuation systems of the present disclosure may include inflatable slides having underwing tubes. In various embodiments, the underwing tubes may be configured to extend under the wing of an aircraft. The underwing tubes may be integral with the inflatable slide and may inflate upon the slide being deployed. Accordingly, in response to the inflatable slide being deployed, the underwing tubes may be extend under the wing of the aircraft and may tend to prevent "kiting" or lifting of the slide.

Figure 1:
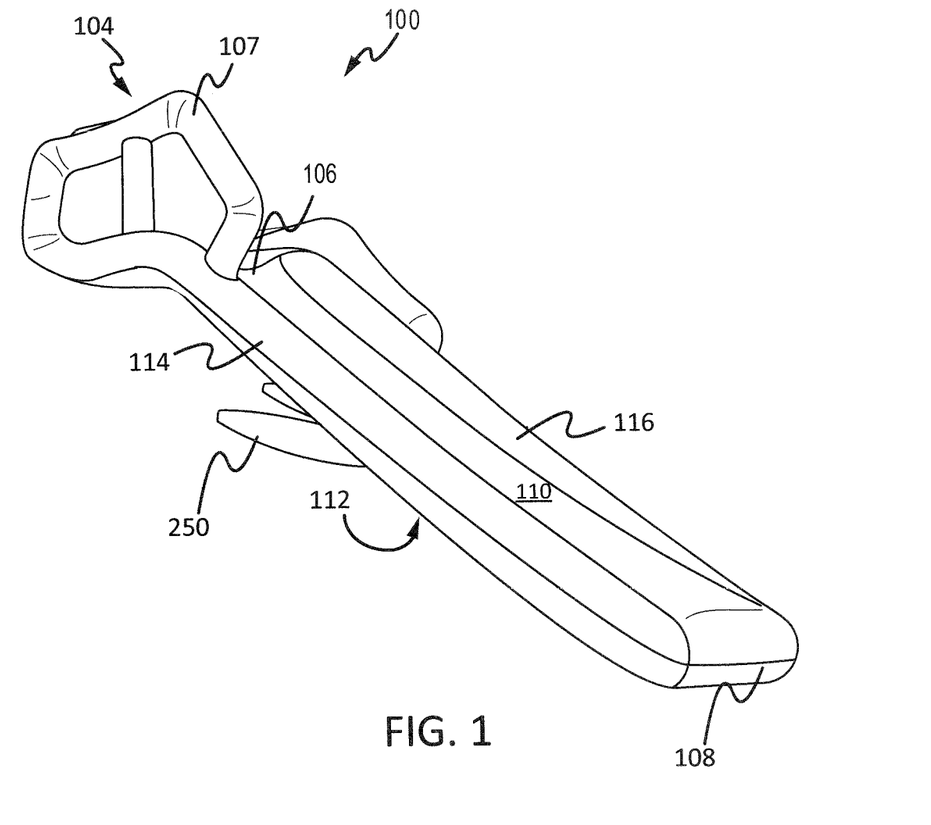
FIG. 1 illustrates a perspective view of an evacuation slide in a deployed position, in accordance with various embodiments.

With reference to FIG. 1, an evacuation system 100 is illustrated, in accordance with various embodiments. Evacuation system 100 may comprise an evacuation slide 104. Evacuation slide 104 may comprise a head end 106 and a toe end 108, opposite head end 106. Head end 106 may be coupled to an aircraft structure. In various embodiments, a railing structure 107 may be coupled to head end 106. Evacuation slide 104 may comprise an inflatable slide. FIG. 1 illustrates evacuation slide 104 in an inflated and/or deployed position. Evacuation slide 104 may comprise a sliding surface 110 and an underside surface 112, opposite sliding surface 110. Sliding surface 110 may extend from head end 106 to toe end 108. Railing structure 107 may provide a lead-in to sliding surface 110. Evacuation slide 104 may comprise an outboard tube 114 and an inboard tube 116. Outboard tube 114 and inboard tube 116 may be disposed on opposing sides of evacuation slide 104. Outboard tube 114 and inboard tube 116 may be integrally formed and in fluid communication. Stated differently, outboard tube 114 and inboard tube 116 may be part of a one interconnected chamber that fills with gas upon deployment of evacuation slide 104. In various embodiments, evacuation system 100 may comprise one or more underwing tubes 250 coupled to evacuation slide 104. Evacuation slide 104 may comprise a single lane slide. However, evacuation slide 104 may comprise any number of lanes. Toe end 108 may contact an exit surface (e.g., the ground) in response to evacuation slide 104 being deployed.

Figure 2:
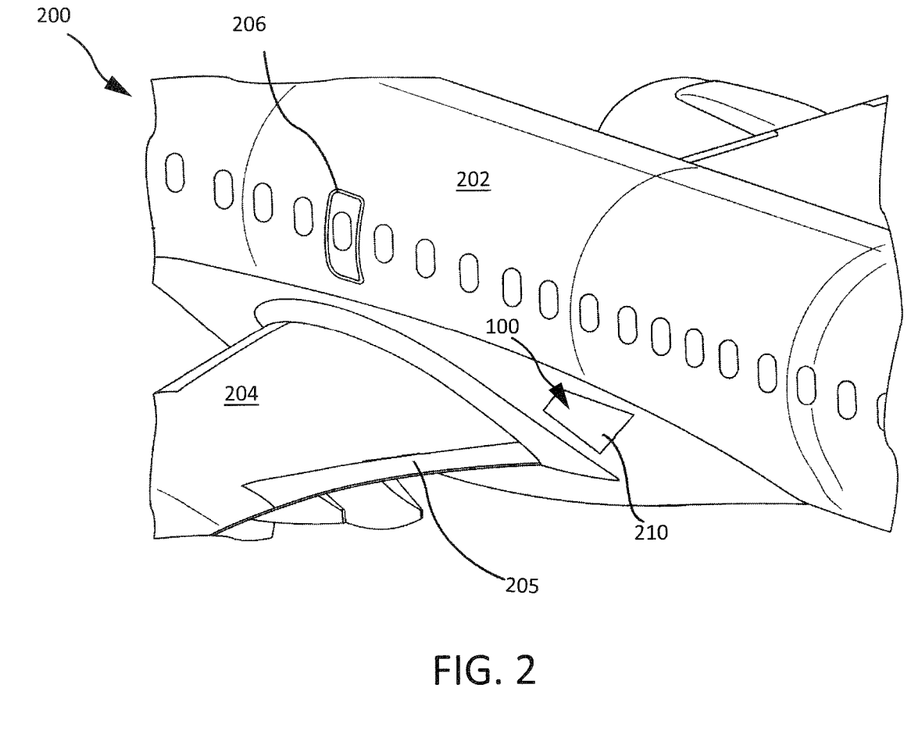
FIG. 2 illustrates a perspective view of an aircraft comprising an evacuation system in a stowed position, in accordance with various embodiments.

Referring to FIG. 2, an exemplary aircraft 200 with evacuation system 100 in a stowed position is shown, in accordance with various embodiments. Aircraft 200 may comprise a fuselage 202 with wings 204 fixed to fuselage 202. Wings 204 may include one or more flaps 205. Emergency exit door 206 may be disposed on fuselage 202 over wing 204 such that passengers exiting emergency exit door 206 would exit onto wing 204. Evacuation system 100 may be installed on the aircraft 200 and may be disposed aft of emergency exit door 206. A blowout panel 210 may cover evacuation system 100. In this regard, with combined reference to FIG. 1 an FIG. 2, evacuation slide 104 may be stowed behind blowout panel 210. In various embodiments, evacuation slide 104 may be folded, when in the stowed position. In response to emergency exit door 206 opening or in response to another evacuation event, evacuation system 100 may jettison blowout panel 210 and evacuation slide 104 may be deployed. In various embodiments, evacuation system 100 may include and/or be housed within a packboard, which may be mounted to aircraft 200.

Figure 3A:
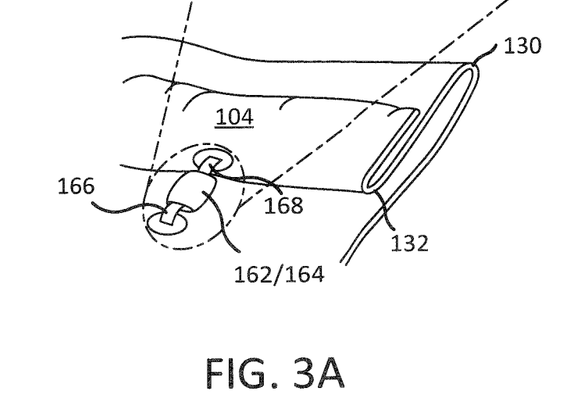
FIGS. 3A and 3B illustrate an evacuation slide with a releasable restraint aiding in retaining the evacuation slide in a folded position, in accordance with various embodiments.
Figure 3B:
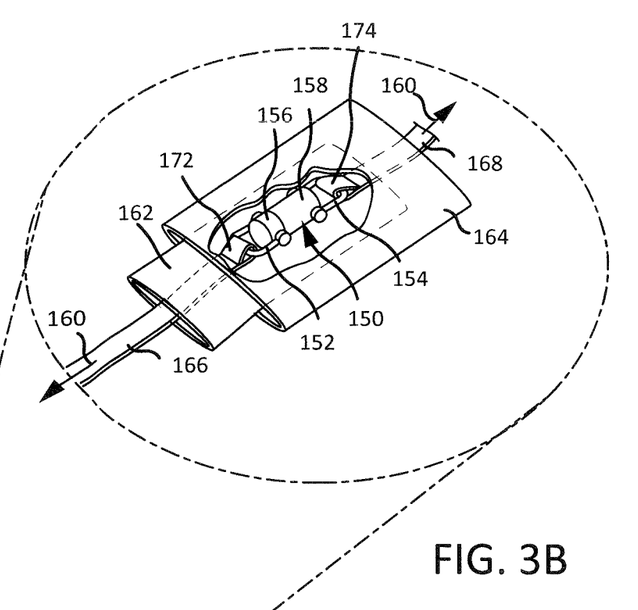

With reference to FIG. 3A and FIG. 3B, evacuation slide 104 is illustrated in a folded position, in accordance with various embodiments. For example, evacuation slide 104 may include a plurality of folds, including first fold 130 and second fold 132, when evacuation slide 104 is in the folded or stowed position. A releasable restraint 150 may aid in maintaining first fold 130 and/or second fold 132. Releasable restraint 150 may aid in staged deployment of evacuation slide 104. Evacuation slide 104 may unfold in response to releasable restraint 150 separating.

In various embodiments, releasable restraint 150 may be configured to separate in response to an internal pressure in evacuation slide 104. For example, a gas cylinder may supply a flow of pressurized fluid to evacuation slide 104 in response to evacuation slide 104 being deployed. Evacuation slide 104 may begin to inflate and an internal pressure of evacuation slide 104 may increase. Releasable restraint 150 may maintain evacuation slide 104 in a folded position until the internal pressure has increased above a predetermined threshold value. Releasable restraint 150 may separate once the internal pressure of evacuation slide 104 has increased above the predetermined threshold value. Evacuation slide 104 may unfold in response to releasable restraint 150 separating. In this regard, evacuation slide 104 may fully deploy in response to releasable restraint 150 separating.

In various embodiments, releasable restraint 150 may include a first shackle 152 and a second shackle 154. In various embodiments, releasable restraint 150 may comprise a shear pin restraint. In this regard, a first portion 156 of releasable restraint 150 may decouple from a second portion 158 of releasable restraint 150 in response to a predetermined tensioning force illustrated by arrows 160. A first cover 162 and/or a second cover 164 may surround releasable restraint 150. Second cover 164 may surround at least a portion of first cover 162. First cover 162 and second cover 164 may comprise a fabric. For example, first cover 162 and second cover 164 may comprise nylon, ballistic nylon, polypropylene, polyester, cotton, or other suitable material.

A first strap 166 may be coupled between evacuation slide 104 and releasable restraint 150. For example, first strap 166 may be attached to an area of sliding surface 110 of evacuation slide 104 (with momentary reference to FIG. 1) and to releasable restraint 150 via first shackle 152. An end 172 of first strap 166 may form a loop through which second shackle 154 is located. In various embodiments, first strap 166 may comprise a rope, tape, ribbon, webbing, or other suitable strap.

A second strap 168 may be coupled between evacuation slide 104 and releasable restraint 150. For example, second strap 168 may be attached to an area of underside surface 112 of evacuation slide 104 (with momentary reference to FIG. 1) and to releasable restraint 150 via second shackle 154. In various embodiments, second strap 168 may be attached to evacuation slide 104 proximate toe end 108, with momentary reference to FIG. 1. An end 174 of second strap 168 may form a loop through which first shackle 152 is located. In various embodiments, second strap 168 may comprise a rope, tape, ribbon, webbing, or other suitable strap. In various embodiments, first strap 166 may be attached to evacuation slide 104 proximate head end 106 and second strap 168 may be attached to evacuation slide 104 proximate toe end 108, with momentary reference to FIG. 1. In this regard, first strap 166 and second strap 168 may be configured to keep evacuation slide 104 in a folded position, until releasable restraint 150 separates.

Figure 4A:
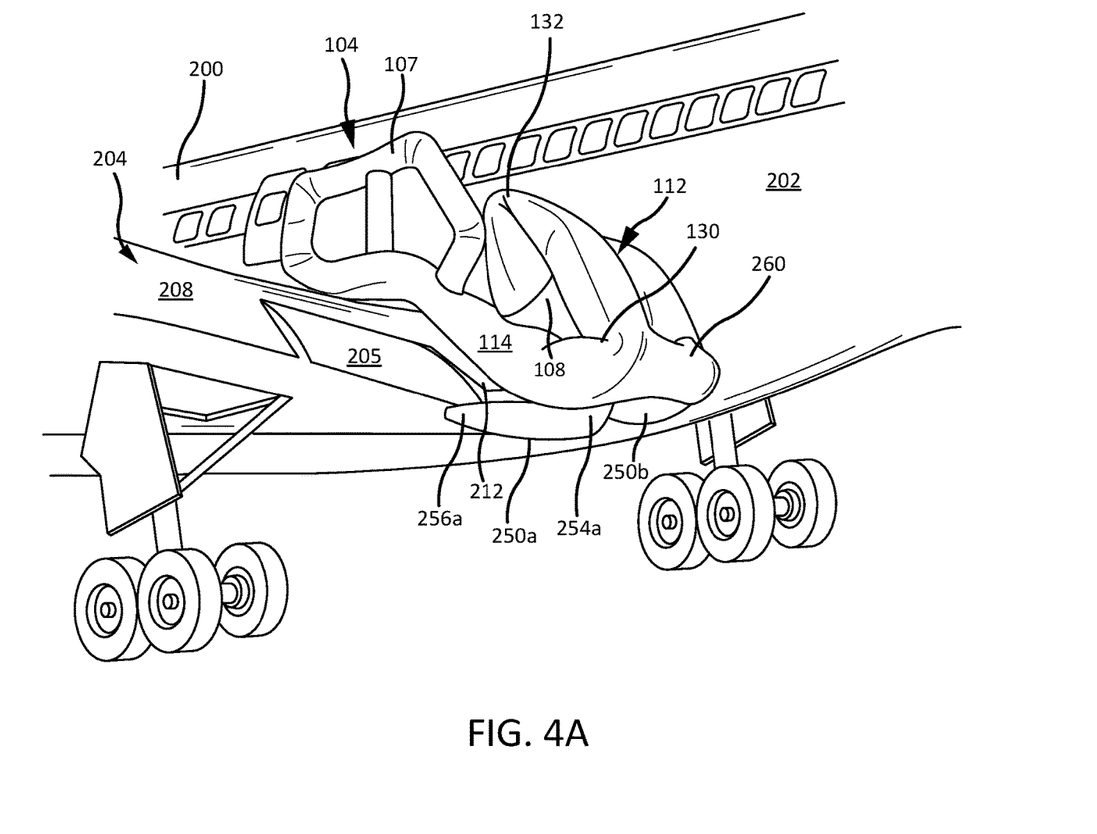
FIGS. 4A, 4B, and 4C illustrate a deployment of an evacuation slide comprising underwing tubes, in accordance with various embodiments.

With reference to FIG. 4A, a deployment of evacuation slide 104 is illustrated, in accordance with various embodiments. During deployment, evacuation slide 104 may begin to inflate with air. Underside surface 112 of evacuation slide 104 may contact an upper surface 208 of wing 204. Upper surface 208 of wing 204 may be oriented generally away from the exit surface. As evacuation slide 104 inflates, one or more underwing tubes (e.g., underwing tube 250a and underwing tube 250b) coupled to evacuation slide 104 may begin to inflate. Inflated underwing tubes 250a and 250b may extend away from underside surface 112 of evacuation slide 104 and extend toward under wing 204. Stated another way, inflated underwing tubes 250a and 250b may be located forward an aft portion 212 of wing 204.

During deployment of evacuation slide 104, an aft edge of flap 205 may be oriented towards the exit surface (i.e., in a "flap down" position). In various embodiments, flap 205 being in the flap down position may cause underwing tubes 250a and 250b to extend forward of flap 205 such that flap 205 may be disposed between underside surface 112 of evacuation slide 104 and underwing tubes 250a and 250b.

Figure 5:
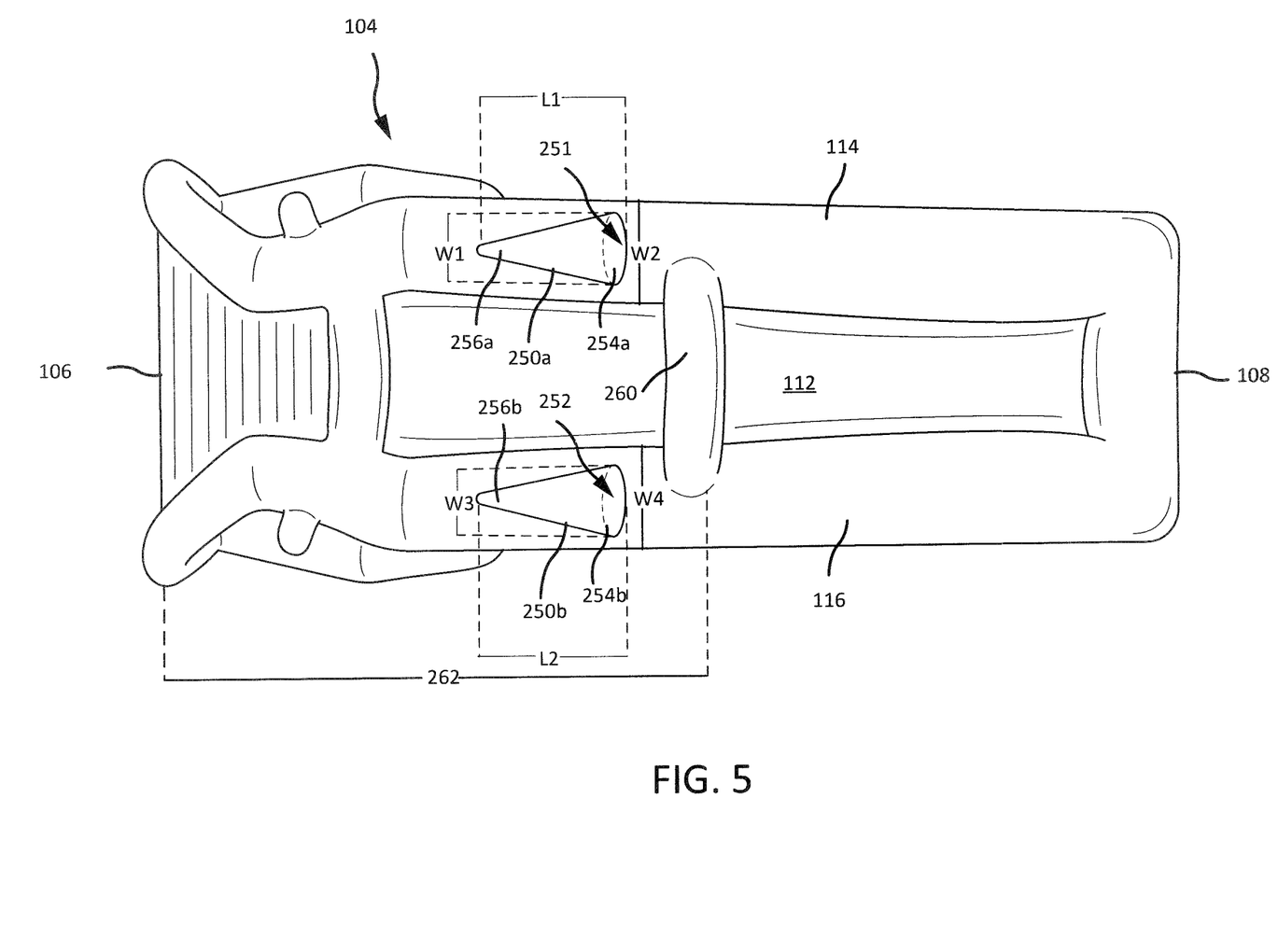
FIG. 5 illustrates an evacuation slide comprising underwing tubes, in accordance with various embodiments.

With reference to FIG. 5, underside surface 112 of evacuation slide 104 is illustrated, in accordance with various embodiments. Underwing tube 250a may be coupled to and may extend from outboard tube 114. Underwing tube 250b may be coupled to and may extend from inboard tube 116. In various embodiments, a base portion of 254a of underwing tube 250a is proximate to outboard tube 114 and may be wider, or have a greater diameter, than a tip portion 256a of underwing tube 250a that is distal to base portion 254a. A base portion of 254b of underwing tube 250b is proximate to inboard tube 116 and may be wider, or have a greater diameter, than a tip portion 256b of underwing tube 250b that is distal to base portion 254b. In various embodiments, underwing tube 250a and underwing tube 250b may comprise a conical shape.

Base portions 254a and 254b may be connected to outboard tube 114 and inboard tube 116, respectively. Tip portions 256a and 256b may be configured to extend toward head end 106. Tip portions 256a and 256b may be configured to extend away from outboard tube 114 and inboard tube 116, respectively, upon inflation of underwing tubes 250a and 250b. Stated another way, as underwing tubes 250a and 250b inflate, underwing tube 250a and outboard tube 114, and underwing tube 250b and inboard tube 116 may partially define, or bound, a volume which can receive flap 205 and/or aft portion 212 of wing 204, with momentary reference to FIG. 4A.

In various embodiments, underwing tubes 250a and 250b may be disposed between a transverse support tube 260 of evacuation slide 104 and head end 106 of evacuation slide 104. In various embodiments, transverse support tube 260 may extend between, and provide a fluid connection between, outboard tube 114 and inboard tube 116. In various embodiments, base portions 254a of underwing tube 250a may be coupled to outboard tube 114 at a location that is between 5% and 60% of a distance 262 between transverse support tube 260 and head end 106. In various embodiments, base portion 254a of underwing tube 250a may be coupled in close proximity to transverse support tube 260; as used herein, the term "close proximity" means that base portion 254a is coupled closer to transverse support tube 260 than to head end 106. In various embodiments, base portion 254a of underwing tube 250a may be located closer to head end 106 than to toe end 108.

In various embodiments, base portions 254b of underwing tube 250b may be coupled to inboard tube 116 at a location that is between 5% and 60% of a distance 262 between transverse support tube 260 and head end 106. In various embodiments, base portion 254b of underwing tube 250b may be coupled in close proximity to transverse support tube 260; as used herein, the term "close proximity" means that base portion 254b is coupled closer to transverse support tube 260 than to head end 106. In various embodiments, base portion 254b of underwing tube 250b may be located closer to head end 106 than to toe end 108.

Underwing tubes 250a and 250b may be integrally formed with evacuation slide 104. In various embodiments, as evacuation slide 104 inflates, underwing tubes 250a and 250b will inflate. Stated another way, underwing tube 250a may be in fluid communication with outboard tube 114. Upon deployment of evacuation slide 104, air may begin to flow into outboard tube 114 and into underwing tube 250a via an opening 251 in outboard tube 114. Underwing tube 250b may be in fluid communication with inboard tube 116. Upon deployment of evacuation slide 104, air may begin to flow into inboard tube 116 and into underwing tube 250b via an opening 252 in inboard tube 116.

With reference to FIG. 4A and FIG. 5, openings 251 and 252 may be configured to allow underwing tubes 250a and 250b to inflate and extend forward flap 205 and/or forward aft portion 212, prior to first fold 130 unfolding. Stated another way, a size of openings 251 and 252 may be selected to control the speed of inflation of underwing tubes 250a and 250b, respectively, such that flap 205 and/or aft portion 212 of wing 204 will be between underside surface 112 of evacuation slide 104 and underwing tubes 250a and 250b prior to releasable restraint 150 separating, with momentary reference to FIG. 3B. Disposing underwing tubes 250a and 250b forward flap 205 and/or forward aft portion 212, prior to toe end 108 unfolding from head end 106, may tend to prevent evacuation slide from kiting, as underwing tubes 250a and 250b may hold an upper half of evacuation slide 104 (i.e., an area of evacuation slide 104 between transverse support tube 260 and head end 106) against upper surface 208 of wing 204 when toe end 108 unfolds. Underwing tubes 250a and 250b holding the upper half of evacuation slide 104 against upper surface 208 of wing 204 tends to act against lifting or kiting forces that may be caused by wind hitting the underside surface 112 of evacuation slide 104 as toe end 108 unfolds (i.e., as toe end 108 travels towards the exit surface).

Figure 4B:
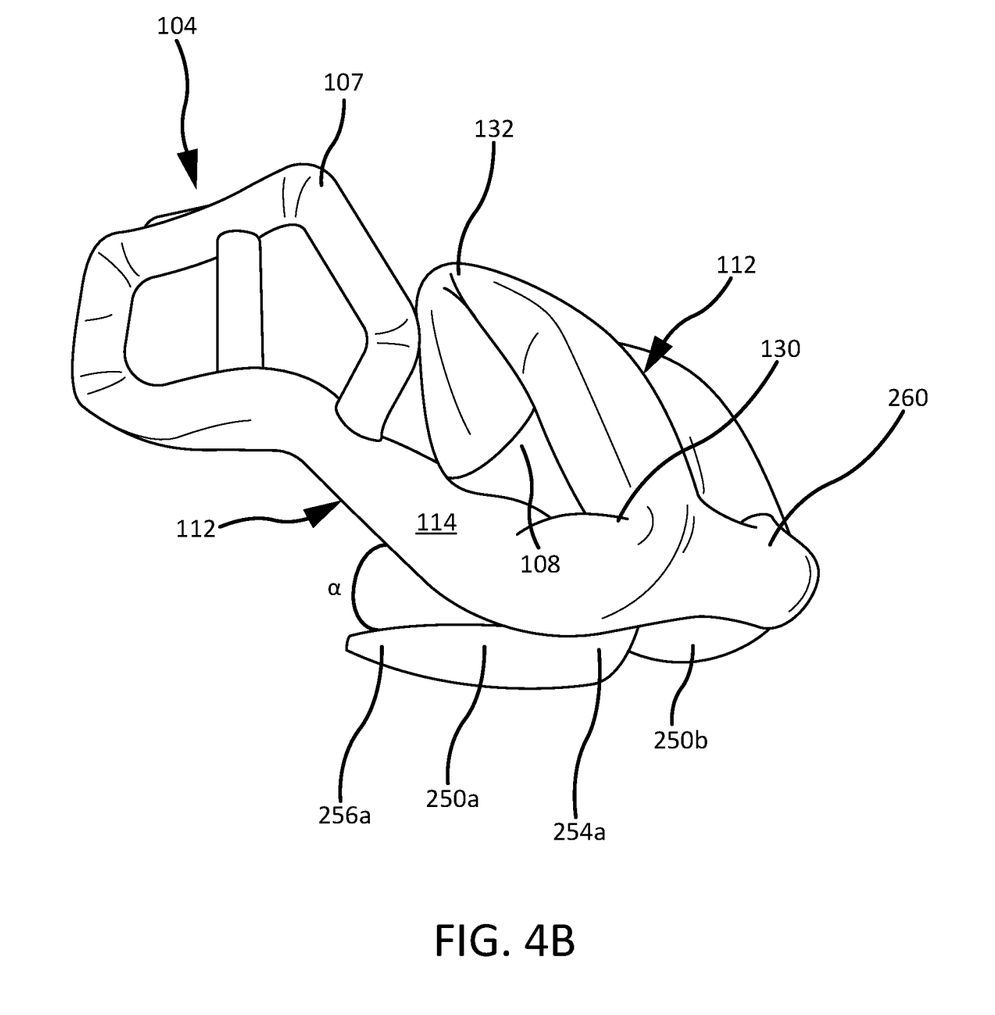

With reference to FIG. 4B, deployment of evacuation slide 104 is illustrated, with aircraft 200 removed for clarity. As underwing tube 250a inflates, tip portion 256a may extend away from outboard tube 114, and away from underside surface 112, at an angle α. In various embodiments, angle α may be between 5° and 85°. In various embodiments, angle α may be between 10° and 80°. Similarly, as underwing tube 250b inflates, tip portion 256b, with momentary reference to FIG. 5, may extend away from inboard tube 116, and away from underside surface 112, at an angle similar to angle α. In various embodiments, tip portion 256b may extend away from inboard tube 116 and underside surface 112 at an angle between 5° and 85°. In various embodiments, tip portion 256b may extend away from inboard tube 116 and underside surface 112 at an angle between 10° and 80°. Underwing tubes 250a and 250b may be configured such that, upon inflation, they will extend away from outboard tube 114 and inboard tube 116, respectively, and away underside surface 112 of evacuation slide 104 at an angle that will accommodate flap 205 and/or aft portion 212 of wing 204 extending between underside surface 112 and underwing tubes 250a and 250b.

Returning to FIG. 5, a location of base portions 254a and 254b and a length L1 of underwing tube 250a and a length L2 of underwing tube 250b may be selected to allow underwing tubes 250a and 250b to extend forward flap 205 and/or forward aft portion 212 of wing 204, during deployment of evacuation slide 104, with momentary reference to FIG. 4A.

In various embodiments, a width W1 of base portion 254a may be between 50% and 90% of a width W2 of outboard tube 114. Width W2 may correspond to a location where underwing tube 250a is coupled to outboard tube 114. In various embodiments, width W1 of base portion 254b is between 75% and 85% of width W2.

In various embodiments, a width W3 of base portion 254b may be between 50% and 90% of a width W4 of inboard tube 116. Width W4 may correspond to a location where underwing tube 250b is coupled to inboard tube 116. In various embodiments, width W3 of base portion 254b is between 75% and 85% of width W4.

Figure 4C:
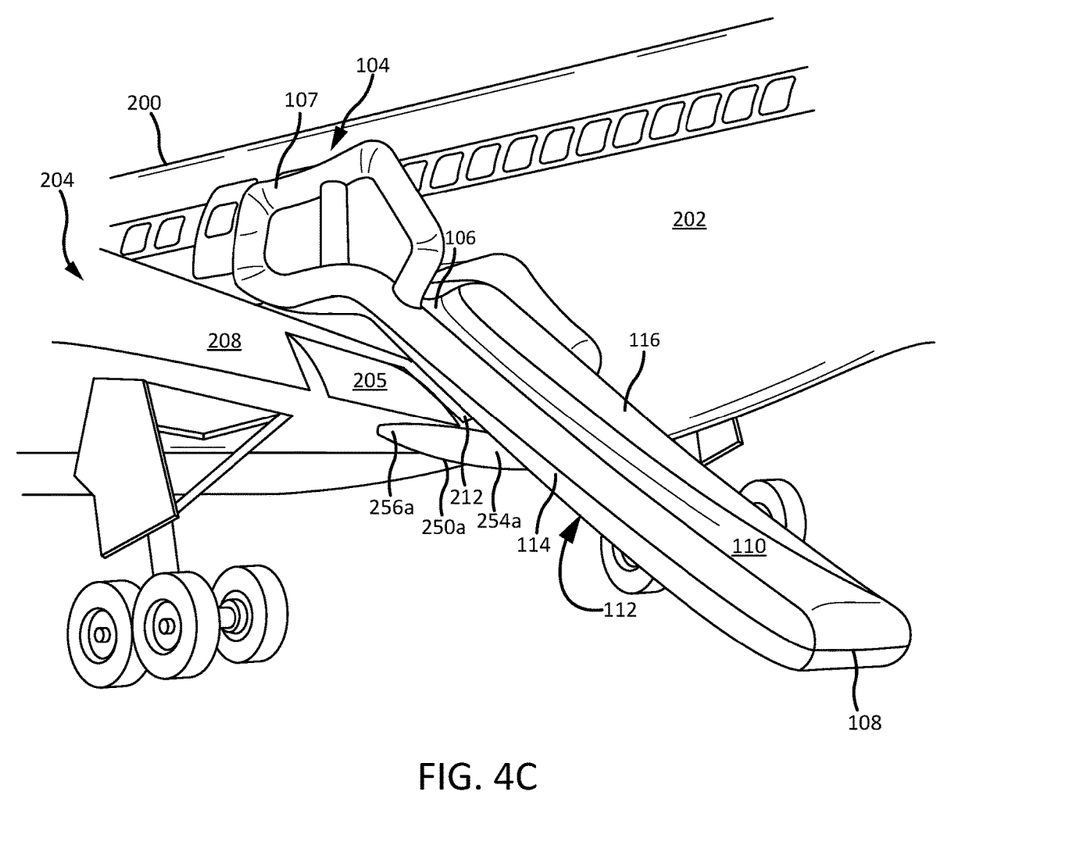

With reference to FIG. 4C, evacuation slide 104 is illustrated in a fully deployed position, in accordance with various embodiments. With reference to FIG. 4C and FIG. 5, flap 205 and/or aft portion 212 of wing 204 may be disposed between underwing tubes 250a and 250b and the underside surface 112 of evacuation slide 104. Stated another way, underwing tubes 250a and 250b may be disposed forward flap 205 and/or forward aft portion 212 of wing 204. For example, flap 205 and/or aft portion 212 of wing 204 may be disposed between underwing tube 250a and outboard tube 114, and flap 205 and/or aft portion 212 of wing 204 may be disposed between underwing tube 250b and inboard tube 116. Disposing underwing tubes 250a and 250b forward flap 205 and/or forward aft portion 212 of wing 204, may tend to prevent evacuation slide 104 from kiting, as underwing tubes 250a and 250b may hold the upper half of evacuation slide 104 (i.e., the area of evacuation slide 104 between transverse support tube 260 and head end 106) against upper surface 208 of wing 204. Underwing tubes 250a and 250b holding the upper half of evacuation slide 104 against upper surface 208 of wing 204 may tend to act against lifting or kiting forces that may be caused by wind hitting underside surface 112 of evacuation slide 104.

Figure 6:
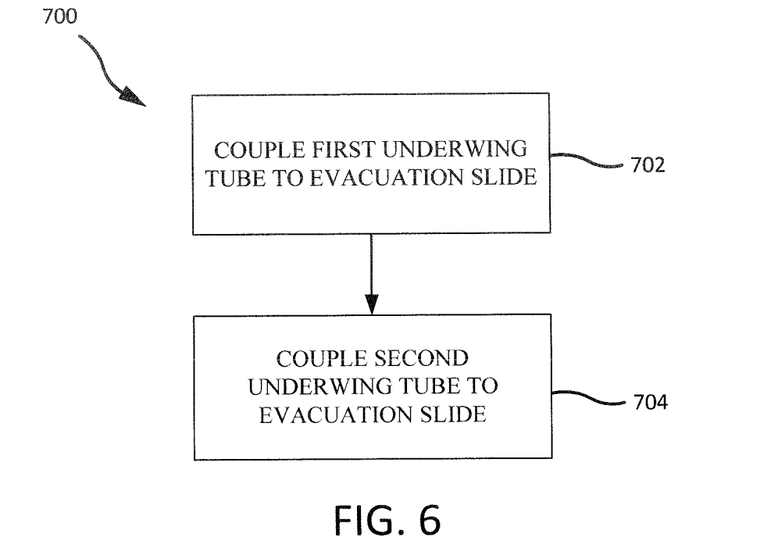
FIGS. 6 and 7 illustrate a method of making an evacuation assembly, in accordance with various embodiments.

With reference to FIG. 6, a method 700 of making an evacuation assembly is illustrated, in accordance with various embodiments. Method 700 may comprise coupling a first underwing tube to an evacuation slide (step 702), and coupling a second underwing tube to the evacuation slide (step 704). The first underwing tube may comprise a first base portion and a first tip portion. The first base portion may be coupled to an underside surface of the evacuation slide and the first tip portion may extend away from the underside surface of the evacuation slide. The second underwing tube may comprise a second base portion and a second tip portion. The second base portion may be coupled to the underside surface of the evacuation slide and the second tip portion may extend away from the underside surface of the evacuation slide.

Figure 7:
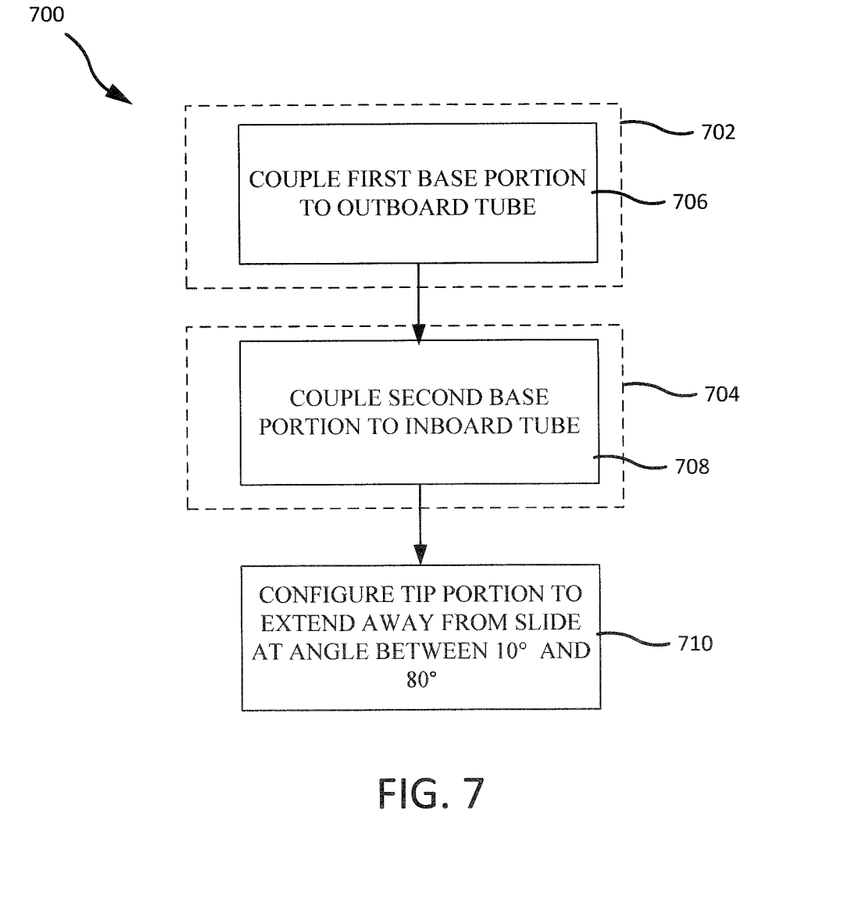

With reference to FIG. 7, in various embodiments, step 702 may comprise coupling the first base portion to an outboard tube of the evacuation slide (step 706), and step 704 may comprise coupling the second base portion to an inboard tube of the evacuation slide. In various embodiments, method 700 may further comprise configuring the first tip portion to extend away from the underside surface of the evacuation slide at an angle between 10° and 80° (step 710).

In various embodiments, with combined reference to FIG. 4A and FIG. 6, step 702 may comprise coupling first underwing tube 250a to evacuation slide 104. Step 704 may comprise coupling second underwing tube 250b to evacuation slide 104. First underwing tube 250a may comprise first base portion 254a and first tip portion 256a. First base portion 254a may be coupled to underside surface 112 of evacuation slide 104 and first tip portion 256a may extend away from underside surface 112 of evacuation slide 104. Second underwing tube 250b may comprise second base portion 254b and second tip portion 256b. Second base portion 254b may be coupled to underside surface 112 of evacuation slide 104 and second tip portion 256b may extend away from underside surface 112 of evacuation slide 104.

In various embodiments, with combined reference to FIG. 4A, FIG. 4B, and FIG. 7, step 706 may comprise coupling first base portion 254a to outboard tube 114 of evacuation slide 104. Step 708 may comprise coupling second base portion 254b to inboard tube 116 of evacuation slide 104. Step 710 may comprise configuring first tip portion 256a to extend away from underside surface 112 of evacuation slide 104 at an angle α between 10° and 80°.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
   an evacuation slide comprising an inboard tube and an outboard tube; and
   a first underwing tube coupled to at least one of the outboard tube of the evacuation slide or the inboard tube of the evacuation slide, wherein the first underwing tube comprises a conical member having a first base portion and a first tip portion, a width of the first tip portion being less than a width of the first base portion, and wherein the first tip portion of the first underwing tube is configured to extend away from an underside surface of the evacuation slide in response to inflation of the first underwing tube, and wherein the first underwing tube and the least one of the outboard tube or the inboard tube define a space configured to receive an aft edge of an aircraft flap in a flap down position, and wherein the first underwing tube is configured to extend forward of the aircraft flap and engage an underside of the aircraft flap in the flap down position.

2. The evacuation system of claim 1, wherein the first tip portion extends away from at least one of the outboard tube or the inboard tube at an angle between 10° and 80°.

3. The evacuation system of claim 1, wherein the width of the first base portion is between 60% and 90% of a width of at least one of the outboard tube or the inboard tube.

4. The evacuation system of claim 1, wherein the evacuation slide further comprises a transverse support tube extending between the outboard tube and the inboard tube.

5. The evacuation system of claim 4, wherein the first base portion of the first underwing tube is disposed closer to the transverse support tube than to a head end of the evacuation slide.

6. The evacuation system of claim 1, wherein the first underwing tube is in fluid communication with at least one of the outboard tube or the inboard tube.

7. The evacuation system of claim 1, further comprising a second underwing tube coupled to at least one of the outboard tube or the inboard tube.

8. The evacuation system of claim 7, wherein the second underwing tube is in fluid communication with at least one of the outboard tube or the inboard tube.

9. The evacuation system of claim 1, further comprising a releasable restraint coupled to the evacuation slide, wherein the first underwing tube is configured to inflate prior to a separating of the releasable restraint.

10. A slide for an evacuation system, comprising:
    an outboard tube;
    an inboard tube;
    a first underwing tube coupled to the outboard tube, the first underwing tube comprising a first member fluidly coupled to the outboard tube, wherein a first tip portion of the first member is configured to extend away from the outboard tube in response to inflation of the first underwing tube, and wherein the first member of the first underwing tube is configured to engage an underside of a first aircraft flap in a flap down position; and
    a second underwing tube coupled to the inboard tube, the second underwing tube comprising a second member fluidly coupled to the inboard tube, wherein a second tip portion of the second member is configured to extend away from the inboard tube in response to inflation of the second underwing tube, and wherein the second member of the second underwing tube is configured to engage at least one of the underside of the the first aircraft flap in the flap down position or an underside of a second aircraft flap in the flap down position.

11. The slide of claim 10, further comprising a transverse support tube extending between the outboard tube and the inboard tube.

12. The slide of claim 11, wherein a first base portion of the first member is disposed closer to the transverse support tube than to a head end of the slide.

13. The slide of claim 10, wherein the first member comprises a first base portion and the first tip portion, and wherein a width of the first base portion is greater than a width of the first tip portion; and
    wherein the second member comprises a second base portion and the second tip portion, and wherein a width of the second base portion is greater than a width of the second tip portion.

14. The slide of claim 10, wherein the first tip portion of the first member extends away from the outboard tube at an angle between 10° and 80°.

15. The slide of claim 13, wherein the second tip portion of the second member extends away from the inboard tube at an angle between 10° and 80.

* * * * *